United States Patent
Li et al.

(10) Patent No.: US 11,674,825 B2
(45) Date of Patent: Jun. 13, 2023

(54) CYLINDRICAL RETROREFLECTOR ARRAY FOR ROTATION TRACKING

(71) Applicant: Apple Inc., Cupertino, CA (US)

(72) Inventors: Xin Li, San Jose, CA (US); Damon R. Lemmon, Santa Cruz, CA (US); David D. Dashevsky, San Jose, CA (US); Dianbo Guo, San Jose, CA (US); Peng Zhao, Cupertino, CA (US); Ruonan Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/480,636

(22) Filed: Sep. 21, 2021

(65) Prior Publication Data

US 2023/0086536 A1    Mar. 23, 2023

(51) Int. Cl.
*G01D 5/347* (2006.01)
*G06F 3/03* (2006.01)
*G06F 3/0362* (2013.01)

(52) U.S. Cl.
CPC ....... *G01D 5/34715* (2013.01); *G01D 5/3473* (2013.01); *G06F 3/0312* (2013.01); *G06F 3/0362* (2013.01)

(58) Field of Classification Search
CPC .............. G01D 5/34715; G01D 5/3473; G06F 3/0312; G06F 3/0362
See application file for complete search history.

(56) References Cited

U.S. PATENT DOCUMENTS

| | | |
|---|---|---|
| 4,203,280 A | 5/1980 | Ziegler |
| 7,557,795 B2 | 7/2009 | Kong et al. |
| 9,453,939 B2 | 9/2016 | Tortora et al. |
| 9,547,280 B2 | 1/2017 | Born et al. |
| 9,753,436 B2 | 9/2017 | Ely et al. |
| 10,145,711 B2 | 12/2018 | Boonsom et al. |
| 10,610,157 B2 | 4/2020 | Pandya et al. |
| 11,036,318 B2 | 6/2021 | Kuboyama |
| 11,194,298 B2 | 12/2021 | Roach et al. |
| 2007/0002013 A1* | 1/2007 | Kong .................... G06F 3/0312 345/157 |
| 2009/0025872 A1* | 1/2009 | Nilsen ..................... B29C 48/05 156/278 |
| 2012/0099199 A1* | 4/2012 | Vasylyev ......... B29D 11/00278 359/530 |

(Continued)

FOREIGN PATENT DOCUMENTS

| | | |
|---|---|---|
| CH | 706101 | 8/2013 |
| WO | WO 10/001299 | 1/2010 |

*Primary Examiner* — Hang Lin
(74) *Attorney, Agent, or Firm* — Brownstein Hyatt Farber Schreck, LLP

(57) ABSTRACT

An electronic device is described. The electronic device may include a housing, a rotatable crown, and a self-mixing interferometry (SMI) sensor positioned within the housing. The rotatable crown may include an array of retroreflective surface features that reflect incident light back to a light source. Each retroreflective surface feature of the array of retroreflective surface features may be formed as a corner-cube with three perpendicular faces. The SMI sensor or associated processing electronics may compare originally emitted light with reflected light to identify a movement or distance of the rotatable crown with respect to the SMI sensor.

16 Claims, 15 Drawing Sheets

(56) References Cited

U.S. PATENT DOCUMENTS

| | | | |
|---|---|---|---|
| 2015/0241751 A1* | 8/2015 | Noble | G02B 27/58 29/428 |
| 2016/0258784 A1* | 9/2016 | Boonsom | G01D 5/347 |
| 2019/0317454 A1* | 10/2019 | Holenarsipur | G04C 3/007 |
| 2021/0089136 A1 | 3/2021 | Hossain et al. | |
| 2021/0199475 A1 | 7/2021 | Dantler et al. | |
| 2021/0405594 A1 | 12/2021 | Holenarsipur et al. | |

* cited by examiner

CYLINDRICAL RETROREFLECTOR ARRAY FOR ROTATION TRACKING

FIELD

The present disclosure is generally directed to the detection of position or movement parameters of an object and, more particularly, to electronic devices having optical encoders that detect position or movement parameters of a rotatable input device.

BACKGROUND

Modern consumer electronics may include and utilize various types of sensors for obtaining user input. For a rotatable input device, such as a rotating crown, an optical encoder may be used to measure rotary motion of the rotatable input device. This may allow a user of a device to provide an input and control an operation of a corresponding electronic device.

Traditional optical encoders, however, typically require separate optical elements that occupy a large amount of space within a housing of a device. This may result in a reduction of the size of other components such as a battery, resulting in decreased battery life. Further, traditional optical encoders require highly sensitive alignment procedures and are sensitive to misalignment during manufacture or during use of a corresponding electronic device. A misaligned traditional rotatable input device results in poor detection of a user input or otherwise provides inaccurate measurement of rotary motion with respect to the optical encoder.

SUMMARY

This summary is provided to introduce a selection of concepts in simplified form that are further described herein. This summary is not intended to identify key features or essential features of the claimed subject matter, nor is it intended to be used as an aid in determining the scope of the claimed subject matter.

The present disclosure is generally directed to an electronic device with an optical encoder. The electronic device may include a rotatable crown and the rotatable crown may be configured to receive a user input to control an operation of the electronic device. An optical encoder may be provided with respect to the rotatable crown and may be used to track a motion, velocity, position, displacement, and other qualities of a rotational input of a rotatable crown. The optical encoder may include a self-mixing interferometry (SMI) sensor. As discussed, the SMI sensor may emit light toward surface features patterned on a surface of the rotatable crown, and/or an associated shaft, and may receive light reflected from the surface features. A self-mixing process may then occur within the SMI sensor. Associated processing electronics may analyze the self-mixing process to identify a movement or distance of the rotatable crown with respect to the SMI sensor.

According to some implementations of the provided disclosure, an electronic device may comprise a housing defining an opening, a display at least partially covering the opening, a crown attached to the housing and operable to be rotated with respect to the housing, a self-mixing interferometry (SMI) sensor having a resonant cavity, and processing electronics coupled to the SMI sensor. The crown may have an array of retroreflective surface features. The SMI sensor may be mounted to the housing and may be operable to emit light from the resonant cavity toward the crown, receive, within the resonant cavity, a portion of the emitted light that reflects from at least one retroreflective surface feature in the array of retroreflective surface features, and generate a SMI signal in response to a self-mixing of light within the resonant cavity. The processing electronics may perform an analysis on the SMI signal and may determine, at least partly in response to the analysis, at least one of a position or a movement parameter of the crown.

In some implementations, each retroreflective surface feature of the array of retroreflective surface features may be formed as a corner-cube having three perpendicular surfaces and the light emitted from the resonant cavity may reflect from each of the three perpendicular surfaces before returning to the resonant cavity.

In accordance with some examples, the array of retroreflective surface features may be anisotropic corner surface features. The array of retroreflective surface features may be arranged on an internal surface of the crown. The crown may define a shaft extending into an internal cavity defined by the housing and the array of retroreflective surface features may circumscribe the shaft. The electronic device may further comprise a sleeve positioned over a portion of the shaft, wherein the array of retroreflective surface features may be formed on an outer surface of the sleeve. The electronic device may further comprise a material overmolded on the array of retroreflective surface features, the material refracting the light emitted toward the array of retroreflective surface features.

According to some aspects of the provided disclosure, an optical encoder may be provided. The optical encoder may comprise a shaft having an array of surface features distributed about a circumference of the shaft, each surface feature in the array of surface features defining a first surface, a second surface perpendicular to the first surface, and a third surface perpendicular to the first surface and the second surface, a self-mixing interferometry sensor configured to emit light toward the circumference of the shaft, receive a portion of the emitted light reflected from the array of surface features, and generate an SMI signal indicative of a position or movement of the shaft, and a housing to which the shaft and the SMI sensor are mounted, the mounting of the shaft and the SMI sensor to the housing defining a rotational movement between the shaft and the SMI sensor.

In some cases, each surface feature of the array of surface features may be retroreflective. Each surface feature of the array of surface features may be shaped as a corner-cube. The array of surface features may be arranged as an overlapping array of surface features, where each surface feature of the array of surface features overlaps with at least one neighboring surface feature.

An optical encoder may further comprise a sleeve positioned over the shaft, wherein the array of surface features is arranged on an outer surface of the sleeve. The optical encoder may further comprise a coating formed about the circumference of the shaft, the coating comprising a gold or a dielectric material, wherein the array of surface features are formed on the coating. The SMI signal may be analyzed by processing electronics to identify a rotational velocity of the shaft.

In accordance with the provided disclosure, a wearable electronic device may be provided. The wearable electronic device may comprise a housing, a strap coupled to the housing and configured to attach the wearable electronic device to a user, a display positioned within the housing, a rotatable crown configured to control an operation of the wearable electronic device, and a self-mixing interferometry (SMI) sensor. The rotatable crown may comprise a shaft that extends through the housing and an array of retroreflective surface features formed on a surface of the shaft. The SMI sensor may be configured to emit light toward the array of retroreflective surface features and receive light reflected from the array of retroreflective surface features.

The SMI sensor may be operable to generate a SMI signal in response to receiving light reflected from the array of retroreflective surface features, the SMI signal corresponding to a movement of the rotatable crown. The SMI signal may be used to control an operation of the wearable electronic device. Each retroreflective surface feature of the array of retroreflective surface features may be formed as a corner-cube having three perpendicular faces. The array of retroreflective surface features may be formed in a single ring around a circumference of the shaft.

BRIEF DESCRIPTION OF THE DRAWINGS

Reference will now be made to representative embodiments illustrated in the accompanying figures. It should be understood that the following descriptions are not intended to limit the embodiments to one or more preferred embodiments. To the contrary, they are intended to cover alternatives, modifications, and equivalents as may be included within the spirit and scope of the described embodiments as defined by the appended claims. Similar reference numerals have been used, where practicable, to designate similar features.

Figure 1A:
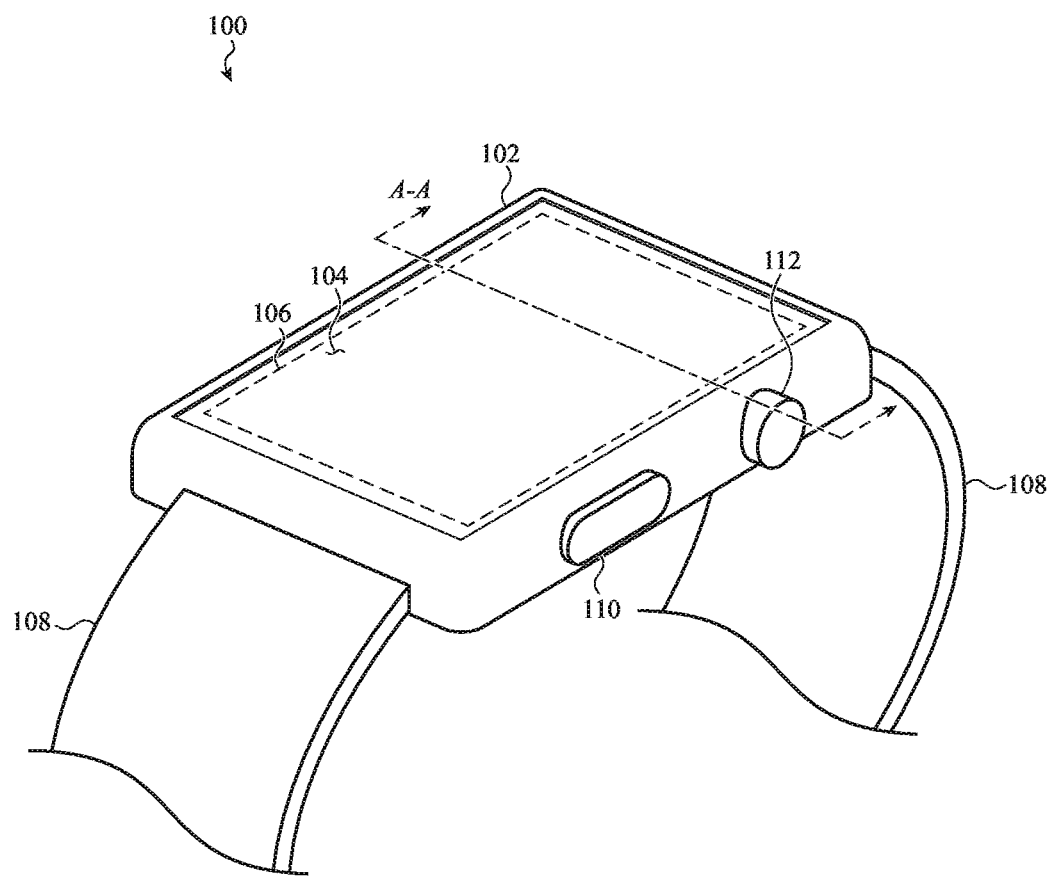
FIGS. 1A-1B illustrate an example electronic device which may include an optical encoder, as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element properties, element dimensions, commonalities of similarly illustrated elements, or any other characteristic, attribute, or property for any element illustrated in the accompanying figures.

Additionally, it should be understood that the properties and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The embodiments described herein are directed to electronic devices and exemplary optical encoders provided within the electronic devices. In particular, the optical encoders as described herein include a rotatable crown and/or shaft having retroreflective surface features and an associated self-mixing interferometry (SMI) sensor.

As described herein, an optical encoder may be provided within any number of electronic devices, such as a wearable electronic device (e.g., a smart watch), a laptop computer, a mobile phone, a tablet computer, and so on. Electronic devices may typically include one or more input devices for receiving a user input. Non-limiting examples of input devices include touch sensors, buttons, dials, and knobs and may be used to provide feedback or commands to an electronic device for performing functions or for providing user input to software or other operations of the electronic device. An electronic device in accordance with the provided disclosure may include a rotary input mechanism, such as a crown on an electronic watch. Traditional crowns may use optical systems to measure the crown as it rotates. However, such systems may lack the precision to measure incremental amounts of rotational input or may require tight manufacturing tolerances.

In accordance with the provided disclosure, an optical encoder may be provided within an electronic device to track a motion, velocity, position, displacement, or other qualities of a rotatable crown. The optical encoder may include a self-mixing interferometry (SMI) sensor that emits light toward a portion of the rotatable crown and receives light reflected from the portion of the rotatable crown. After receiving the reflected light, the SMI sensor may generate SMI signals that may be analyzed to characterize a statistical property. The statistical property may then be used to characterize position or movement parameters of an object (e.g., a rotational velocity of a rotatable crown).

The rotatable crown, or a portion thereof, may additionally have an array of retroreflective surface features disposed on a surface thereof. The retroreflective surface features may have any retroreflective shape suitable for retroreflection (e.g., light being reflected back to the source of the light). One such example, as discussed herein, is a corner-cube shape with three perpendicular faces. Light emitted toward the retroreflective surface features may reflect from each of the faces and may return to the light source (e.g., a SMI sensor). After returning to the SMI sensor, a self-mixing operation may occur and analysis of a self-mixing signal may be used to identify position or movement parameters of the rotatable crown with respect to the SMI sensor.

The retroreflective surface features may be provided at a particular angle with respect to the SMI sensor. For example, the retroreflective surface features may be disposed at glancing angles between 40°-70°, with respect to the SMI sensor, to establish a suitable angle of incidence range and in order for the SMI sensor to detect position or movement parameters of the rotatable crown. In some implementations, the retroreflective surface features may be coated with a particular material, such as gold, a dielectric material, or a combination thereof, to increase an associated reflectivity.

Such an optical encoder may provide a number of benefits. For example, the retroreflective nature of the surface features may permit wider alignment tolerances so long as light emitted from the light emitter comes into contact with at least one retroreflective surface feature. Additionally, a size (e.g., beam size) of emitted light may over-fill a particular retroreflective surface feature such that at least a portion of the light undergoes retroreflection even when not perfectly centered. A SMI sensor may comprise both a light emitter (e.g., a laser light source) and a light receiver (e.g., a photodetector). The light emitter and the light receiver may be stacked and may have a small form-factor. For example, separate light emitters and light receivers may require a certain amount of space for each individual component. A SMI sensor may reduce the amount of space required. As a result, additional internal components (such as a battery) may be increased in size, thereby increasing a capacity/quality of the enlarged internal components (e.g., increasing a battery life as a result of increasing a battery size). Further, a SMI sensor may result in a higher degree of precision and accuracy when identifying position or movement parameters (e.g., rotation) of the rotatable crown.

As the term is used herein, a SMI sensor is a sensor configured to generate electromagnetic radiation (e.g., light), emit the electromagnetic radiation from a resonant cavity, receive a returned portion of the electromagnetic radiation (e.g., reflected or scattered), coherently or partially coherently self-mix the generated and returned electromagnetic radiation, and produce an output indicative of the self-mixing (e.g., a SMI signal). The generated, emitted, and returned electromagnetic radiation may be coherent or partially coherent. In some implementations, the electromagnetic radiation emitted by a SMI sensor may be generated by an electromagnetic radiation source, such as a laser (such as a vertical-cavity surface-emitting laser (VCSEL), a vertical external-cavity surface-emitting laser (VECSEL), a quantum-dot laser (QDL), a quantum cascade laser (QCL), an edge-emitting laser (EEL), a horizontal cavity surface-emitting laser (HCSEL), a solid state laser (SSL), or a gas laser). In some embodiments, the electromagnetic radiation source may be a light-emitting diode (LED), such as an organic LED (OLED), a resonant-cavity LED (RC-LED), a micro LED (mLED), a superluminescent LED (SLED), or an edge-emitting LED. The electromagnetic radiation emitted and received by the SMI sensor may include visible or invisible light, such as infrared or ultraviolet light. The output of a SMI sensor (e.g., the SMI signal) may include a photocurrent produced by a photodetector (e.g., a photodiode) integrated with the SMI sensor's electromagnetic radiation source. Additionally, the SMI signal may include a measurement of the current or junction voltage of the SMI sensor's electromagnetic radiation source.

As discussed herein, the retroreflective surface features may have any number of retroreflective shapes. For example, spherical retroreflective surface features may be provided to reflect light back to an original light source. The spherical retroreflective surface features may be overlapping or may otherwise be discrete and non-overlapping. Any of the retroreflective surface features discussed herein may additionally include an at least partially transparent overmolding. For example, a reflector may be formed of a reflective material and may have a shape designed to reflect light to a certain point. Through overmolding, a transparent material, such as a resin, glass, or plastic, may be poured over the reflector and may refract light before and after the light contacts the reflector. In this way, a number of available disposition angles may be increased.

In accordance with the provided disclosure, a high SMI signal strength may be provided, with respect to potential interference from other subsystems of an electronic device. The high SMI signal strength may provide increased tolerance and reliability against potential contaminants such as dust or other particles. In accordance with the high SMI signal strength, alignment sensitivity may be reduced. That is, a high SMI signal may result in sufficient SMI processing even when part of the signal is lost. In accordance with the provided disclosure, sensor noise, resulting in signal dropout, may be reduced or eliminated. That is, laser speckle (e.g., random variations arising from laser operation) may be eliminated as optical path length may be normalized due to the presence of retroreflective surface features.

These and other systems, devices, methods, and apparatuses are described with reference to FIGS. 1A-13. However, those skilled in the art will readily appreciate that the detailed description given with respect to these figures is for explanatory purposes only and should not be construed as limiting.

FIG. 1A illustrates an example electronic device 100 (e.g., a wearable electronic device such as a watch) according to one or more embodiments of the provided disclosure. As previously noted, aspects of the provided disclosure are not limited to integration with the electronic device 100 depicted in FIG. 1A and other electronic devices, such as a laptop computer or a mobile phone, may be used in some implementations.

The electronic device 100 may include a housing 102 defining a shell and an outer perimeter of the electronic device 100. The housing 102 may comprise one or more holes, openings, and/or cavities which input and/or output devices may be at least partially positioned within (e.g., to provide input options or output to a user of the electronic device). For example, a rotatable crown 112 may at least partially protrude from a hole formed within the housing 102. The housing 102 may comprise one (e.g., as a unibody housing) or more pieces coupled together through fasteners including mechanical fasteners and/or chemical fasteners.

As depicted in FIG. 1A, one or more bands 108 may be used to couple the electronic device 100 to a body part of a user. For example, a user may use the one or more bands 108 to secure the electronic device 100 to the user's wrist.

A display 106 may be positioned within an opening formed in a top portion of the housing 102. The display 106 may be used to provide graphical elements (e.g., a graphical user interface) or other forms of visual output to a user of the electronic device 100. For example, the display 106 may display a graphical user interface comprising a number of interactable elements such as digital menus or digital buttons. In some implementations, touch or force sensors may be provided with respect to the display 106 and may be used to detect touch or force inputs. Such displays may be referenced as a touch-sensitive display. A transparent cover 104 may be provided within the opening formed in the top portion of the housing 102 and above the display 106. The transparent cover 104 may be fully or partially transparent so that a user of the electronic device 100 may perceive the graphical elements generated by the display 106. The transparent cover 104 may be formed from any fully or partially transparent material, including glass, sapphire, resin, polyethylene, any combination thereof, and so on. The display 106 may be any suitable display including a liquid crystal display (LCD), light-emitting diode (LED) display, quantum dot (QLED) display, organic light-emitting diode (OLED) display, any combination thereof, and so on.

As discussed above, the electronic device 100 may include a number of input devices, such as a button 110 and a rotatable crown 112. The button 110 and rotatable crown 112 may be provided on a side surface of the electronic device 100 and may be depressible and/or rotatable with respect to the housing 102. For example, the button 110 may be depressible and may be used to operate a number of features of the electronic device 100, such as activating the display 106 of the electronic device 100 or providing a confirmation signal to the electronic device 100.

The rotatable crown 112 may include a dial or knob for receiving rotational input from a user of the electronic device 100. As discussed herein, an associated optical encoder may measure position or movement parameters (e.g., a rotation) of the rotatable crown 112. For example, a user may rotate the rotatable crown 112 at a particular rotational velocity. As a non-limiting example, a slow velocity input may be used when the user intends to scroll slowly through a graphical output and a fast velocity input may be used when the user intends to scroll quickly through the graphical output. The optical encoder, as discussed herein, may be used to detect the particular velocity input and may translate that input into instructions for the electronic device 100 (e.g., scroll quickly through the graphical output when receiving velocity input at the rotatable crown 112 that is above a threshold value and scroll slowly through the graphical input when receiving velocity input at the rotatable crown 112 that is below the threshold value).

In some implementations, the rotatable crown 112 may have a textured top and/or side surface. For example, a side surface of the rotatable crown 112 may comprise a number of grooves to provide friction which may allow a user to grip the rotatable crown 112.

The rotatable crown 112 may be provided with an optical encoder, as discussed herein, which may be used to detect aspects of the rotation of the rotatable crown 112 including the direction of movement, amount of movement, rate of movement, change in the rate of movement, and so on. The movement may be rotational movement, translational movement, angular movement, and any other kind of movement of the rotatable crown. Output from the optical encoder representing movement of the rotatable crown 112 may be used as input to the electronic device 100. For example, the encoder output may be used to manipulate graphics, images, icons, and/or other graphical elements of a user interface as provided on the display 106. In some implementations, the encoder output may be used to select a graphical icon or move a graphical cursor. Aside from being rotatable, the rotatable crown 112 may also be pushed, pressed, or otherwise actuated to provide an additional input to the electronic device 100.

Figure 1B:
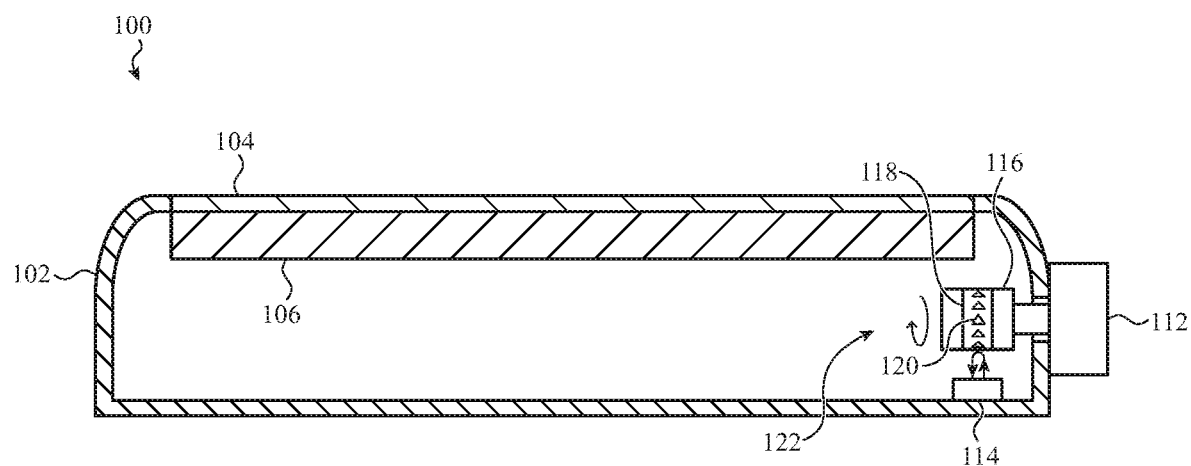

FIG. 1B illustrates a cross-section of the electronic device 100 across line A-A. In FIG. 1B, a number of internal components are omitted for clarity. For example, components such as a battery, a haptic actuator, a processor, a memory, and one or more sensors may be provided in an electronic device 100 in accordance with the provided disclosure. Further, the rotatable crown 112 may be operably coupled to any one of the omitted components (e.g., the processor) in order to provide signals for controlling operations of the electronic device 100. It is additionally noted that the scale and relative size of components in the cross-section depicted in FIG. 1B may be exaggerated to better illustrate certain principles and may not be representative of the actual size of the components.

The electronic device 100 may include an optical encoder 122 which may include a shaft 116, a coating 118, an array of surface features 120 surrounding a circumference of the shaft 116, and a self-mixing interferometry (SMI) sensor 114.

As described with respect to FIG. 1A, a display 106 and an overlying transparent cover 104 may be positioned within an opening defined by the housing 102. The rotatable crown 112 may extend through an additional opening defined by the housing 102 to access an internal cavity defined by the housing 102. As depicted in FIG. 1B, the rotatable crown 112 may include a shaft 116 extending into the internal cavity of the housing 102. The shaft 116 may be coupled with the head of the rotatable crown 112 and may rotate in accordance with rotation of the rotatable crown 112.

A coating 118 may additionally be provided on a portion of the shaft 116. The coating 118 may be a reflective coating and may be formed from, for example, gold, a dielectric, or a combination thereof. The coating 118 may increase a reflectivity (e.g., retroreflectivity) of the array of surface features 120. It is noted that the coating 118 may, in some implementations, be omitted. Further, in some implementations, the entire shaft 116 may be comprised of materials such as gold, a dielectric, or a combination thereof.

An array of surface features 120 may be formed within the coating 118 and/or the shaft 116. Hereinafter, the array of surface features 120 will be discussed with respect to being formed on the shaft 116, though it is appreciated that this is simply for ease of terminology and the array of surface features 120 may additionally or alternatively be formed on the coating 118 or other associated structures (e.g., a sleeve). The array of surface features 120 may be formed on the shaft 116 through a number of mechanical or electrical processes. For example, the array of surface features 120 may be engraved (e.g., by laser engraving), milled, carved, and so on, on the shaft 116.

Figure 3A:
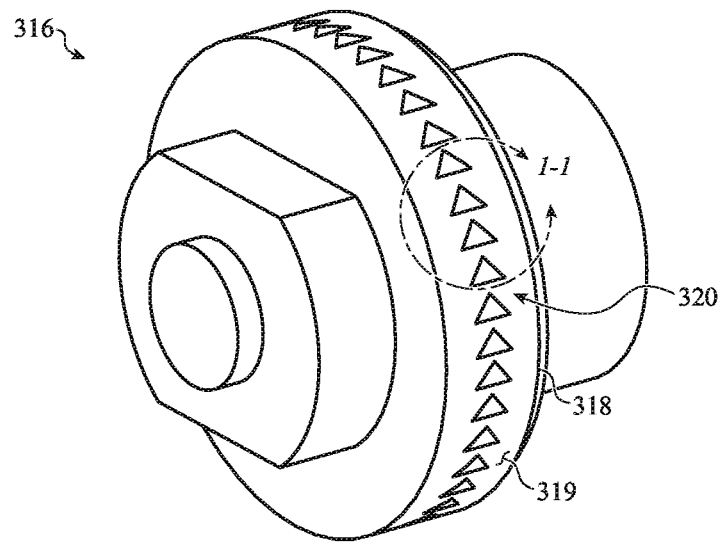
FIGS. 3A-3B illustrate an example shaft of an optical encoder having an array of retroreflective surface features, as described herein.
Figure 3B:
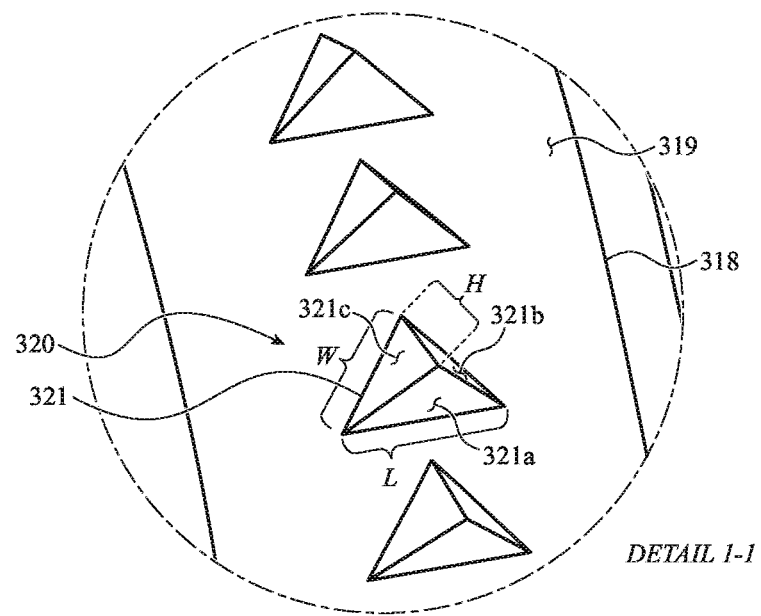

The array of surface features 120 may be a retroreflective array of surface features, such that light received at a portion of a surface feature is returned to the light source (see discussion surrounding FIGS. 3A-3B). The shape of the array of surface features 120 is not particularly limited and may include any shape used to retroreflect light. In FIG. 1B, the array of surface features 120 are depicted as three perpendicular faces (e.g., a corner cube) appearing as a triangle in the two-dimensional plane. Each surface feature may be ordered back-to-back (e.g., as a single ring around a surface of a shaft) such that a tip of one surface feature is proximate to a base of a neighboring surface feature. The array of surface features 120 may circumscribe the shaft either entirely or partially. Dimensions of the array of surface features are not particularly limited and may, in some implementations, have a width of about 0.15 millimeters (mm) to about 0.30 mm, have a height of about 0.03 mm to about 0.05 mm, and have a length of about 0.125 mm to about 0.150 mm.

A self-mixing interferometry (SMI) sensor 114 may be positioned proximate to the shaft 116 of the rotatable crown 112 and may emit light toward, and receive light reflected from, the array of surface features 120. The SMI sensor 114 is depicted as being positioned on the housing 102 in FIG. 1B, but it is noted that this is just one example implementation. In some implementations, the SMI sensor 114 may be provided on a chip (e.g., a system on a chip (SoC)), may be coupled to a circuit board, may be coupled to a battery, and so on. In some implementations, the SMI sensor 114 may be positioned on an internal side wall of the housing 102 and may be positioned at an angle with respect to the array of surface features 120.

As discussed above, the SMI sensor 114 may include an electromagnetic radiation source (e.g., a light emitter) configured to emit light and a photodetector (e.g., a photodiode) configured to receive reflected light. The electromagnetic radiation source and the photodetector may be provided in any number of arrangements. For example, the electromagnetic radiation source and the photodetector may be provided in a stacked configuration such that the electromagnetic radiation source is stacked on top of the photodetector. Other arrangements may additionally be used in accordance with the provided disclosure. A detailed description of the SMI process may be found with respect to FIG. 2.

As illustrated in FIG. 1B, the SMI sensor 114 may emit light toward the rotatable crown 112 and, in particular, to the array of surface features 120 disposed on the shaft 116 of the rotatable crown 112. As discussed, the array of surface features 120 may include retroreflective surface features which may return light to a source of the light. This reflected light may be received by the SMI sensor 114 to be used in accordance with SMI processing.

It is noted that the shape of the array of surface features 120 is not limited to any particular embodiment. Any number of retroreflective surface features 120 may be used in accordance with the provided disclosure. In some implantations, a transparent overmolding may be provided on top of the array of surface features 120 and may partially refract light before the light is reflected from the array of surface features 120. The transparent overmolding may smooth a top surface of the shaft 116.

Figure 2:
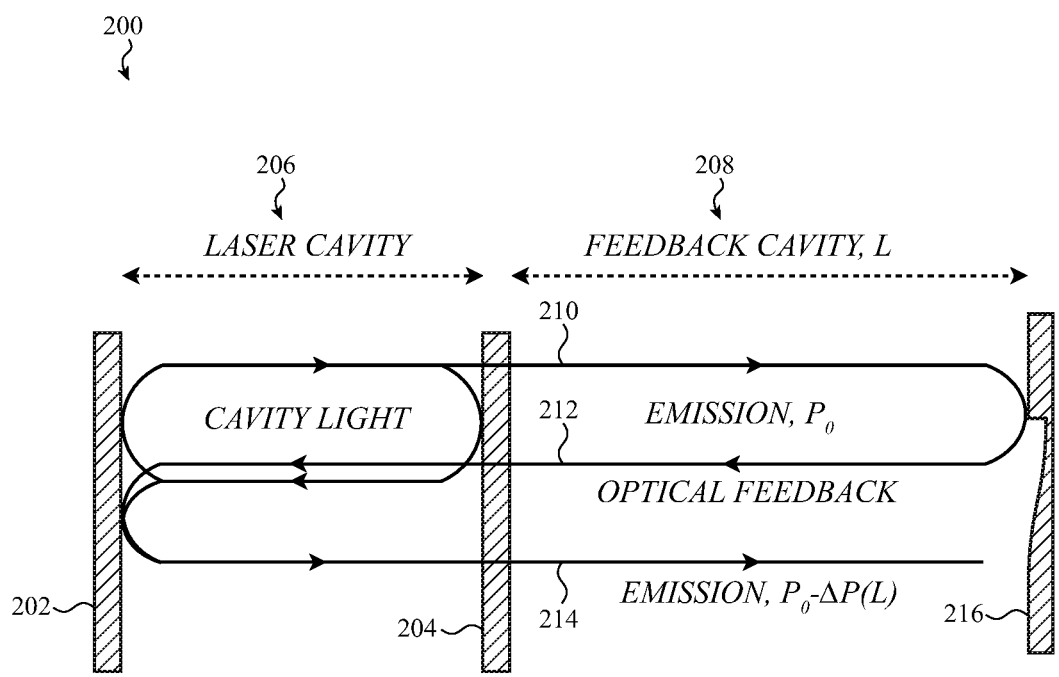
FIG. 2 depicts an explanatory diagram of a self-mixing interferometry process, as described herein.

FIG. 2 depicts a functional diagram 200 of an electromagnetic radiation source, such as a laser and/or VCSEL, that may be used as part of a self-mixing interferometry (SMI) sensor (e.g., the SMI sensor 114). As referenced in FIG. 2, an input energy source causes a gain material within a laser cavity 206 to generate light. Mirrors 202 and 204 on opposite ends of the laser cavity 206 feed the light back into the gain material to cause amplification of the light within the laser cavity 206 and to cause the light to become coherent, with a uniform wavelength, or partially coherent, with a partially uniform wavelength. One mirror (e.g., mirror 204) may be partially reflective and may permit light (e.g., a laser light) to escape the laser cavity 206 once the light is amplified to a sufficient amount.

The laser cavity 206 has a length established at manufacture and may be established in accordance with desired properties of emitted light. After escaping the laser cavity 206, the emitted laser light 210 travels away from the laser cavity 206 until it intersects or impinges on a target 216, such as an input surface or another object. As discussed above, the target 216 may be one or more surface features of an array of surface features as provided on a rotatable crown and/or an associated shaft. The target 216 may be fully or partially retroreflective and may return reflected laser light back into the laser cavity 206 through the mirror 204. The gap of distance L from the emission point through the mirror 204 of the emitted laser light 210 to the target 216 is termed the feedback cavity 208. The length L of the feedback cavity 208 is variable as the target 216 can move with respect to the laser device. In particular, the feedback cavity 208 may change based on an impinged portion of the array of surface features as the array of surface features are rotated via a rotatable crown.

After the emitted light 210 (e.g., an emission $P_0$) comes into contact with the target 216, part or all of the emitted light 210 may be reflected back into the laser cavity 206 as optical feedback 212. The reflected light enters the laser cavity 206 to coherently or partially coherently interact with the generated laser light. This results in a new state illustrated with a novel emission 214, $P_0$-$\Delta P(L)$. The new emitted laser light 214 at the new state may have characteristics (e.g., a wavelength or power) that differ from what the emitted laser light 210 would have in the absence of reflection and self-mixing interference. Properties of the novel emission may change depending on a length of the feedback cavity 208 (e.g., with respect to an impinged portion of the array of surface features.

An associated photodetector may analyze the novel emission 214 and the emitted laser light 210 and may compare properties of the respective emissions to identify position or movement parameters of the target 216. For example, the results of analyzing a SMI signal may refer to, for example, a rotational velocity, distance, or a position of a rotatable crown. The SMI signal may be analyzed using the photodetector to produce a photocurrent, which may have properties usable to identify position or movement parameters of the target 216. Additionally, the SMI signal may include a measurement of the current or junction voltage of the SMI sensor's electromagnetic radiation source.

A power and/or junction voltage of the electromagnetic radiation source may fluctuate with time and may be based on the self-mixing operation. Time and frequency domain analyses may be performed on these fluctuations and the interpretations may be computed to identify position or movement parameters of a rotatable crown. For example, a particular output may correspond to a particular rotational velocity and may be detectable in accordance with fluctuating power and/or junction voltages. In this way, position or movement parameters, such as a distance, displacement, and rotational velocity, may be detected and identified. The position or movement parameters may be determined in response to processes performed by processing electronics operably coupled to the SMI sensor. As provided herein, the processing electronics may analyze a SMI signal to determine the position or movement parameters of the crown. The processing electronics may be provided with respect to any embodiment discussed herein to perform SMI signal analysis.

FIGS. 3A-3B illustrate an example shaft 316 of a rotatable crown and an array of retroreflective surface features 320 positioned on a surface thereof. The shaft 316 may be rotatable and the array of retroreflective surface features may be patterned around the circumference of a portion of the shaft 316.

The array of retroreflective surface features 320 may be provided as a row with successive retroreflective surface features positioned behind one another (e.g., as a single ring around a circumference of the shaft 316). Each retroreflective surface feature may be spatially separated from one another by a predetermined distance (e.g., 0.1 mm) and may be identical to every other retroreflective surface feature in the array. In some implementations, the spacing between each successive retroreflective surface feature may vary and may not be identical (e.g., for modulation). The array of retroreflective surface features 320 may be spaced to reduce speckle modulation by allowing an incident beam of light to traverse a particular retroreflective surface feature completely before impinging on a neighboring retroreflective surface feature. In some implementations, as discussed herein, retroreflective surface features may be overlapped with one another (see, e.g., FIGS. 5A-5B).

The shaft 316 may additionally have a coating 318 formed on a portion circumscribing the shaft 316. In some implementations, the coating 318 may be provided over the array of retroreflective surface features 320. In other implementations, the array of retroreflective surface features 320 may be formed into the coating 318. The coating 318 may be an at least partially reflective material and may be gold, a dielectric material, or any combination thereof.

An overmolding 319 may additionally be provided and may be a uniform layer over the coating 318. The overmolding 319 may be a high refractive index transparent polymer (e.g., a polycarbonate) and may increase an angle of incidence for retroreflectivity to occur (with respect to an incident beam of light) by refracting a portion of the incident beam of light before the incident beam of light reflects from one of the array of retroreflective surface features 320. In this way, an outer surface of the shaft 316 may be a smooth cylindrical surface. It is additionally noted that the overmolding 319 is optional and may be removed in some implementations in accordance with the provided disclosure.

FIG. 3B depicts a detailed view of a retroreflective surface feature 321 of the array of retroreflective surface features 320, along curve 1-1 as depicted in FIG. 3A. The retroreflective surface feature 321 may be identical, or substantively identical, to every other retroreflective surface feature of the array of retroreflective surface features 320 and is provided as a representative example.

The retroreflective surface feature 321 may be in the form of a corner of a cube, with three faces perpendicular to one another. This shape may also be referenced as a "corner-cube," as discussed herein. The retroreflective surface feature 321 may have a first face 321a, a second face 321b, and a third face 321c. The first, second, and third faces 321a-321c, as depicted, may each have an equivalent, or substantially equivalent, area and may be flat, or substantially flat, faces.

The retroreflective surface feature 321 may have a width W, a length L, and a height H. These dimensions are not particularly limited and may be associated with dimensions of a larger cube on which the corner-cube portion is based. In some implementations, the width W may be between 0.125 mm and 0.15 mm, the length L may be between 0.10 mm and 0.40 mm, and the height H may be between 0.02 mm and 0.06 mm. These dimensions are provided for explanatory purposes only and any values in accordance with the provided disclosure may be used in alternative embodiments. Each of the retroreflective surface features of the array of retroreflective surface features 321 may have equivalent dimensions or may, in some implementations, have different dimensions.

Figure 4A:
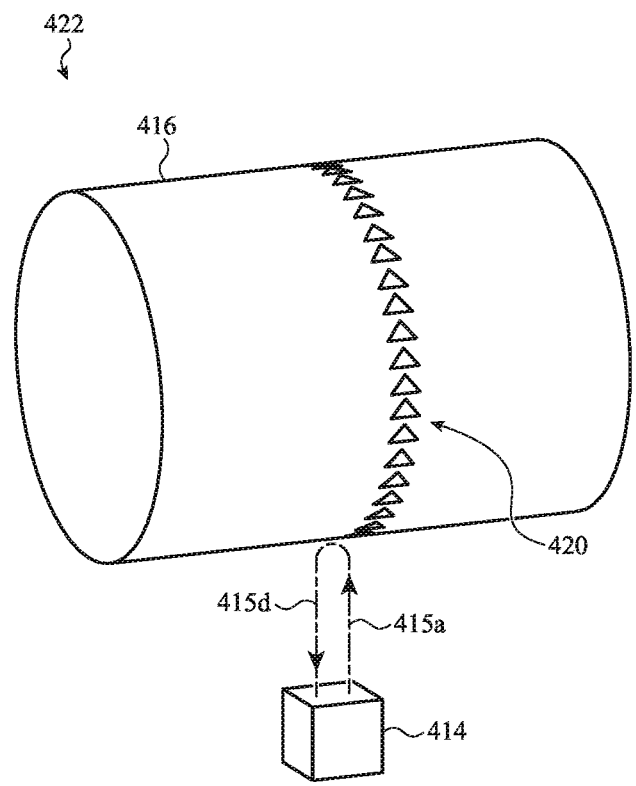
FIGS. 4A-4C illustrate an example optical encoder having retroreflective surface features along a length of a shaft, operations of an associated self-mixing interferometry sensor, and details of a retroreflective surface feature, as described herein.
Figure 4B:
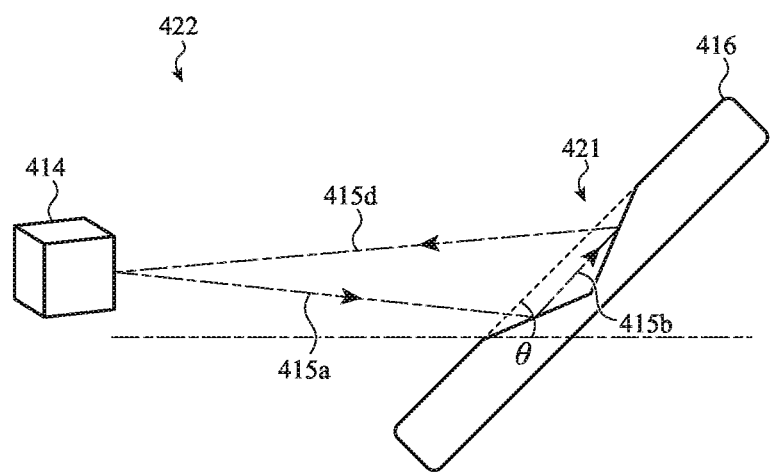
Figure 4C:
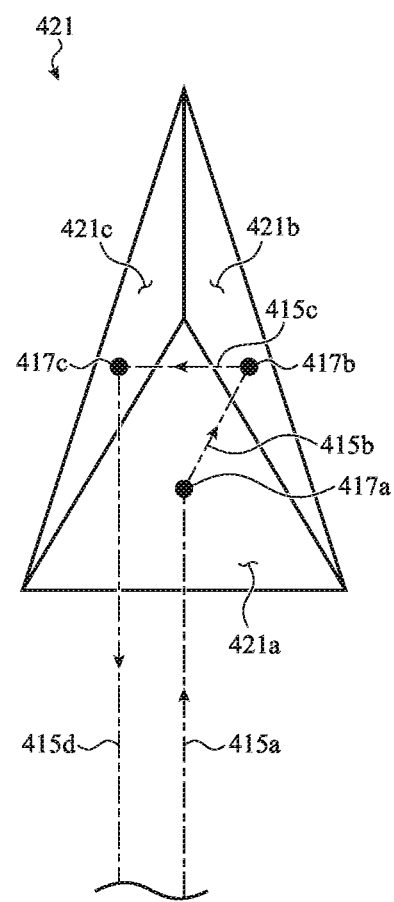

FIGS. 4A-4C illustrate a representation of an optical encoder 422 and an associated retroreflective surface feature 421. The optical encoder 422 includes a shaft 416, an array of retroreflective surface features 420 positioned along a circumference of the shaft 416, and a self-mixing interferometry (SMI) sensor 414 disposed to emit light toward the array of retroreflective surface features 420.

The SMI sensor 414 may emit emitted light 415a toward a surface feature of the retroreflective surface features 420 and may receive reflected light 415d from the surface feature. The emitted light 415a may have different properties than the reflected light 415d as an interaction of the light with the surface feature may change, for example, a wavelength or intensity of the light. As discussed with reference to FIG. 2, this variation in properties may be analyzed to identify position or movement parameters of the shaft 416 and associated rotatable crown, including a rotational velocity, a position, a distance, and so on.

With reference to FIG. 4B, a retroreflective surface feature 421 may be provided at an angle θ with respect to emitted light 415a from the SMI sensor 414. The angle θ may be selected to control the angle of incidence between the emitted light 415a and the retroreflective surface feature 421 (e.g., a first face of the retroreflective surface feature). As discussed with respect to FIG. 4C, emitted light 415a may reflect off of the retroreflective surface feature 421 at three different times/locations, such that the emitted light 415a reflects from each perpendicular face of the retroreflective surface feature 421. Due to optical principles, only a certain range of incident angles results in the proper retroreflection (e.g., reflection off of each of the three faces). That is, at certain, extreme angles, the emitted light 415a may be reflected away from the SMI sensor 414. The window in which retroreflection occurs may be referenced herein as the retroreflection angle of incidence.

To ensure that the retroreflection angle of incidence is wide and that retroreflection occurs, the retroreflective surface 421 may be rotated away from the surface normal by an angle θ. The angle θ may be selected to increase the available retroreflection angle of incidence up to, for example 65°. The angle θ may be set to any number of values and may, in some implementations, be between 15° and 75° with respect to the surface normal.

FIG. 4C illustrates an example retroreflective surface feature 421 depicting a retroreflective operation. As discussed previously, a SMI sensor may generate and emit emitted light 415a toward a shaft of a rotatable crown, generally, and, more specifically, to a retroreflective surface feature provided on the shaft, the rotatable crown, and/or an associated sleeve. When the emitted light 415a comes into contact with a first face 421a (in accordance with a retroreflective angle of incidence) at first point 417a, the emitted light 415a may reflect off of the first face 421a, as first reflected light 415b, toward the second face 421b. As discussed above, the first face 421a and the second face 421b are perpendicular to one another.

The first reflected light 415b may contact the second face 421b at a second point 417b, in accordance with the physical laws of reflection. After contacting the second face 421b at the second point 417b, the light may again reflect as second reflected light 415c and be directed toward the third face 421c. As discussed, the third face 421c is perpendicular with respect to both the second face 421b and the first face 421a. The second reflected light 415c may contact the third face 421c at a third point 417c and may be reflected from the third face 421c as third reflected light 415d. As discussed above, the third reflected light 415d may be directed back toward the light emitter (e.g., the SMI sensor).

As the light reflects three times off of the perpendicular faces, a polarization of the emitted light 415a may correspond to a polarization of the third reflected light 415d. As such, the self-mixing process may occur within the SMI sensor coherently, thereby producing SMI signals usable to detect position or movement parameters of the rotatable crown and associated shaft.

While three reflections are discussed with respect to FIG. 4C, it is noted that any number of reflections may be provided in accordance with the retroreflective principles of the provided disclosure. In some implementations, the number of reflections may be established (e.g., by establishing a geometry of the retroreflective surface feature) based on a desired polarity of a reflected light (e.g., third reflected light 415d as received by an SMI sensor) with respect to the emitted light (e.g., emitted light 415a).

As discussed herein, a size of a beam of light may be larger than any single retroreflective surface feature (e.g., the retroreflective surface feature 421). This may be referenced as an overfill. Through such an arrangement, a portion of the incident beam may undergo retroreflection and a signal strength of a resulting SMI signal may be kept consistent.

Figure 5A:
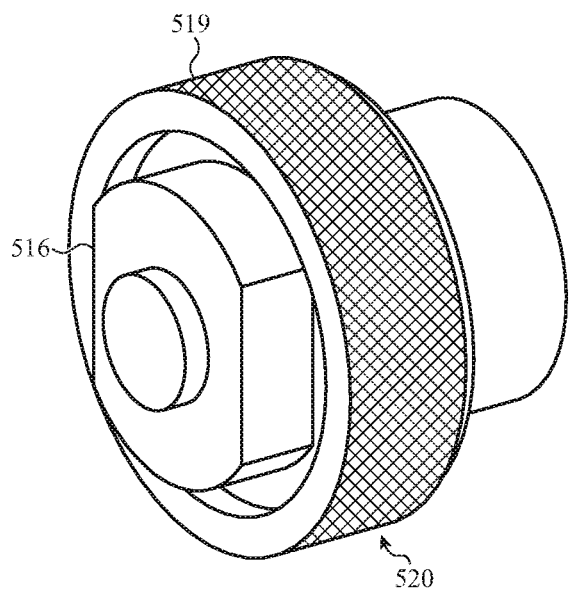
FIGS. 5A-5B illustrate an example shaft of an optical encoder and an associated sleeve patterned with an array of retroreflective surface features, as described herein.
Figure 5B:
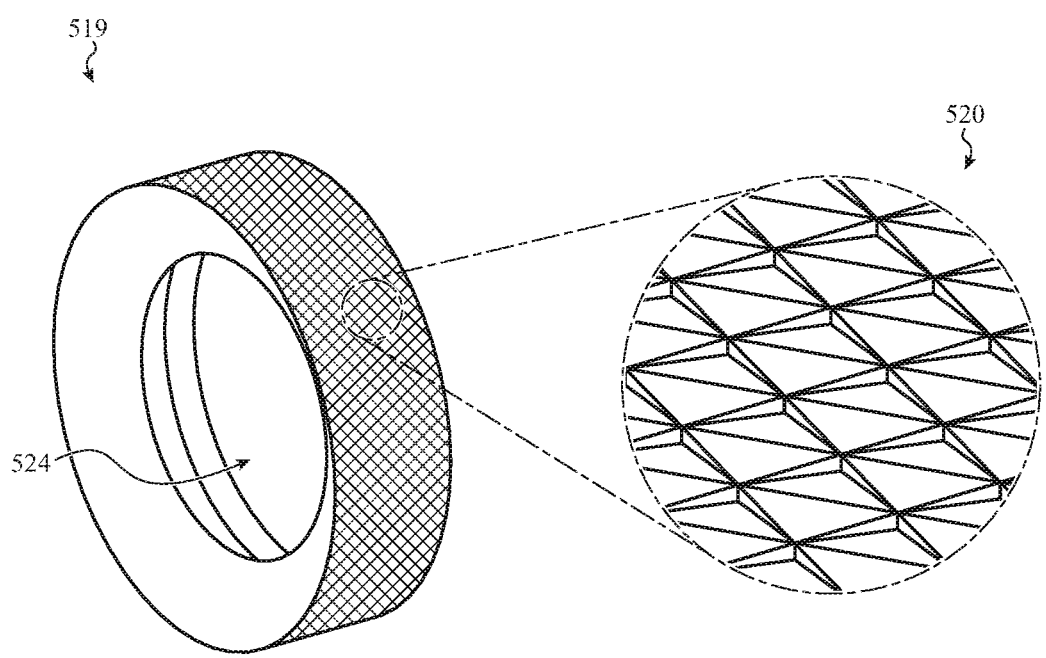

FIGS. 5A-5B illustrate an example shaft 516 of an optical encoder and an associated sleeve 519 patterned with an array of retroreflective surface features 520. The shaft 516, as discussed with reference to FIGS. 1A-4C, may be a metallic shaft and may be coupled or otherwise affixed to a rotatable crown of an electronic device. That is, as the rotatable crown rotates, the shaft 516 may rotate by a corresponding amount.

The sleeve 519 may be positioned to surround the shaft 516 and may, in some implementations, be removeable. The shaft 516 may comprise a number of engagement features, such as a slope or edge, which may engage the sleeve 519 so as to secure the sleeve 519 to the shaft 516. The sleeve 519 may have corresponding engagement features 524 (e.g., corresponding slopes or edges), on an internal surface of the sleeve 519. In this way, the engagement features 524 may couple (e.g., slidably couple) with the shaft 516 to be secured thereupon.

The sleeve 519 may be formed from any number of materials, such as a rubber, metal, polyethylene, or ceramic, and may have an outer surface stamped with an array of retroreflective surface features 520. The sleeve 519 may be a molded ring and may be manufactured with injection molding, insert molding, or through any other suitable manufacturing process.

With reference to FIG. 5B, the sleeve 519 may be patterned with an array of retroreflective surface features 520. The array of retroreflective surface features 520 may be an array of closely packed surface features such as depicted in the detailed view depicted in FIG. 5B. Each particular surface feature may comprise a corner-cube shape with three perpendicular faces, such as described with respect to FIGS. 1A-4C. However, in contrast to the surface features arranged in a single ring, as described above, neighboring surface features may be configured to overlap, creating a repeating pattern with no significant space between neighboring surface features. The surface features may be retroreflective, such that light contacting a surface feature is reflected back to a light source/emitter.

It is noted that the pattern of the array of retroreflective surface features 520 as depicted is only one example and other shapes/arrangements for the array of retroreflective surface features 520 may be used in accordance with a sleeve 519 (e.g., a removeable sleeve). For example, the surface features depicted in FIGS. 3A-3B (e.g., a single ring of retroreflective surface features) may be patterned on a removeable sleeve instead of the overlapping surface features depicted in FIGS. 5A-5B.

Figure 6A:
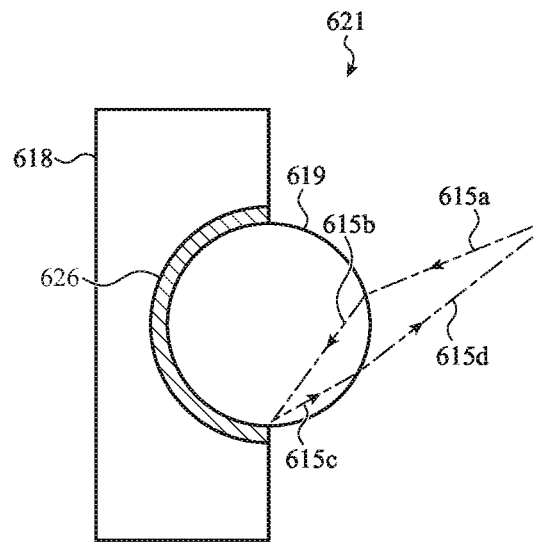
FIGS. 6A-6B illustrate example spherical retroreflective surface features and an example shaft having a sleeve patterned with the spherical retroreflective surface features, as described herein.
Figure 6B:
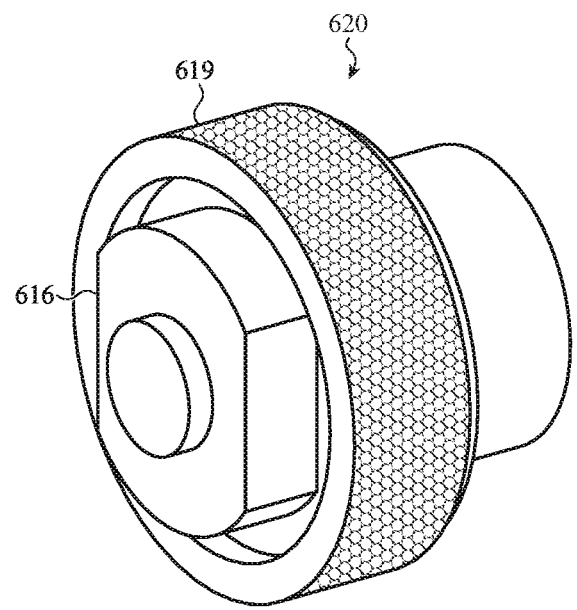

FIGS. 6A-6B illustrate an additional example of a retroreflective surface feature, a spherical retroreflective surface feature 621. The spherical retroreflective surface feature 621 may include a semi-spherical reflector 626 and an overmolding 619. The semi-spherical reflector 626 may define the back of the spherical retroreflective surface feature 621 and may be made of a reflective material (e.g., a material reflective to at least a wavelength of light emitted by a light emitter). That is, once a beam of light contacts the semi-spherical reflector 626, the beam of light may reflect.

The overmolding 619 may fill the area defined by the semi-spherical reflector 626 and may be formed of an at least partially transparent material, such as a glass, resin, or polycarbonate. As the overmolding 619 is at least partially transparent, light coming into contact with the overmolding 619 may be refracted instead of being fully reflected.

With respect to FIG. 6A, emitted light 615a (e.g., light emitted from a SMI sensor and/or light emitter) may be directed toward the spherical retroreflective surface feature 621. Once the emitted light 615a comes into contact with the overmolding 619, the emitted light 615a may refract as first refracted light 615b. A degree of refraction may depend on a material of the overmolding 619 and may be established in accordance with retroreflective principles (e.g., to ensure that the light returns to the light source after reflection). After a first refraction, the light may reflect from the semi-spherical reflector 626 as reflected light 615c. The light may then refract, again, from the overmolding 619 as second refracted light 615d. In this way, the light may return to a location of the light source for successive self-mixing operations. As illustrated in FIG. 6A, the spherical retroreflective surface feature 621 may be formed on a coating 618, such as described with respect to FIGS. 3A-3B.

FIG. 6B illustrates an example sleeve 619 having an array of spherical retroreflective surface features 620 patterned on a top surface thereon. The sleeve 619 may be formed from any material, such as rubber, polyethylene, metal, and so on, and may be overmolded with the overmolding 619 such that the top surface of the sleeve 619 is smoothed. In some implementations, the overmolding 619 may be formed as discrete spheres, such that the overmolding 619 defines a non-uniform top surface.

As discussed with respect to FIGS. 5A-5B, the sleeve 619 may be positioned over a shaft 616 as coupled with a rotatable crown. Therefore, the shaft 616 and sleeve 619 may rotate in correspondence with rotation of the associated rotatable crown. Though the array of spherical retroreflective surface features 620 is illustrated as being arranged in a uniform grid spanning across the surface of the sleeve 619, the array of spherical retroreflective surface features 620 may be arranged in a single file arrangement, as a single ring around a circumference of the shaft 616, in some implementations.

Figure 7A:
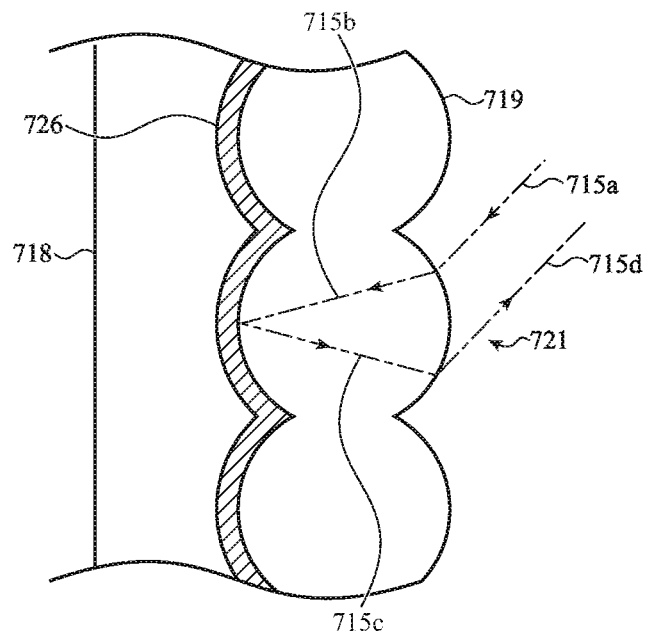
FIGS. 7A-7B illustrate example overlapping retroreflective surface features and an example shaft having a sleeve patterned with the overlapping retroreflective surface features, as described herein.
Figure 7B:
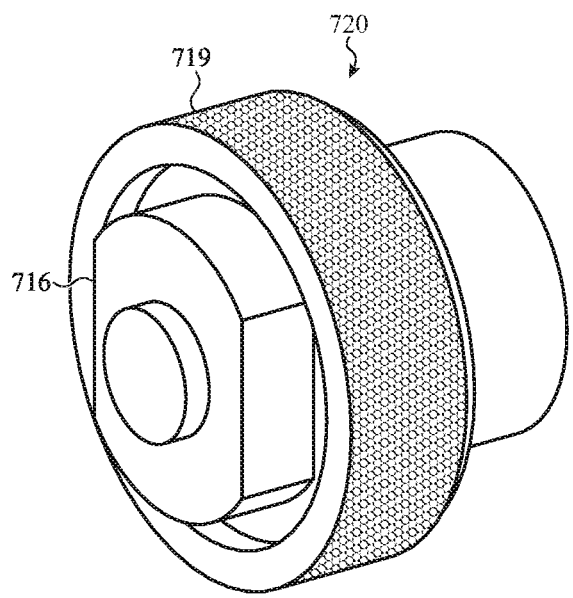

FIGS. 7A-7B illustrate an additional example of a retroreflective surface feature, an overlapping spherical retroreflective surface feature 721. The overlapping spherical retroreflective surface feature 721 may be similar to that discussed with respect to FIGS. 6A-6B, but may be overlapping, rather than discrete, with neighboring surface features. The overlapping spherical retroreflective surface feature 721 may include a reflector 726 defining a back portion of a number of retroreflective surface features (e.g., the array of overlapping spherical retroreflective surface features 720) and an overmolding 719 spanning across the reflector 726. The reflector 726 may be made of a reflective material (e.g., a material reflective to at least a wavelength of light emitted by a light emitter). That is, once a beam of light contacts the reflector 726, the beam of light may reflect.

The overmolding 719 may fill the area defined by the reflector 726 and may be formed of an at least partially transparent material, such as a glass, resin, or polycarbonate. As the overmolding 719 is at least partially transparent, light coming into contact with the overmolding 719 may be refracted instead of being fully reflected.

With respect to FIG. 7A, emitted light 715a (e.g., light emitted from a SMI sensor and/or light emitter) may be directed toward the overlapping spherical retroreflective surface feature 721. Once the emitted light 715a comes into contact with the overmolding 719, the emitted light 715a may refract as first refracted light 715b. A degree of refraction may depend on a material of the overmolding 719 and may be established in accordance with retroreflective principles (e.g., to ensure that the light returns to the light source after reflection). After a first refraction, the light may reflect from the reflector 726 as reflected light 715c. The light may then refract, again, from the overmolding as second refracted light 715d. In this way, the light may return to a location of the light source for successive self-mixing operations. As illustrated in FIG. 7A, the overlapping spherical retroreflective surface feature 721 may be formed on a coating 718, such as described with respect to FIGS. 3A-3B.

FIG. 7B illustrates an example sleeve 719 having an overlapping array of spherical retroreflective surface features 720 patterned on a top surface thereon. The sleeve 719 may be formed from any material, such as rubber, polyethylene, metal, and so on, and may be overmolded with the overmolding 719 such that the top surface of the sleeve 719 is smoothed. In some implementations, the overmolding 719 may be formed as overlapping spheres, such that the overmolding 719 defines a non-uniform top surface.

As discussed with respect to FIGS. 5A-5B, the sleeve 719 may be positioned over a shaft 716 as coupled with a rotatable crown. Therefore, the shaft 716 and sleeve 719 may rotate in correspondence with rotation of the associated rotatable crown. Though the overlapping array of spherical retroreflective surface features 720 is illustrated as being arranged in a uniform grid spanning across the surface of the sleeve 719, the array of spherical retroreflective surface features 720 may be arranged in a single file arrangement, as a single ring around a circumference of the shaft 716, in some implementations. The overlapping array of spherical retroreflective surface features 720 may have an angle of incidence at or above 45°, though this is just provided as an example and the angle of incidence is not limited to any particular value.

Figure 8:
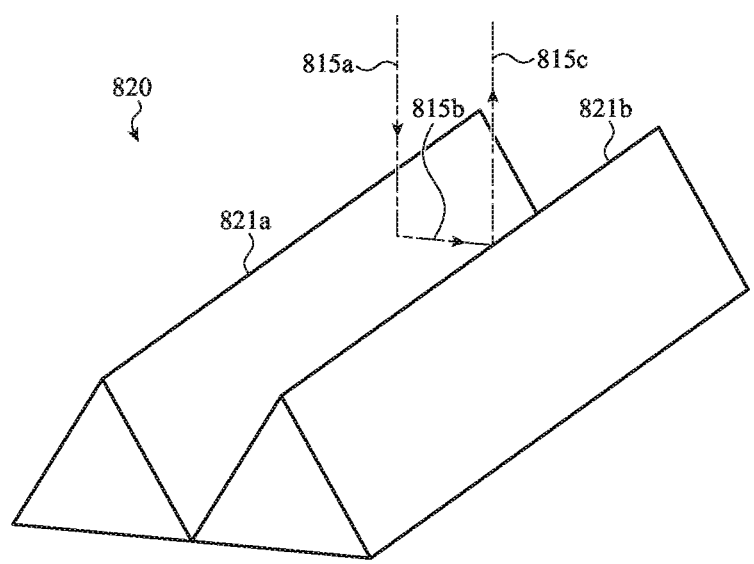
FIG. 8 illustrates example anisotropic surface features, as described herein.

FIG. 8 illustrates an example anisotropic corner array 820 as an example of a retroreflective surface feature. The anisotropic corner array 820 may include a first anisotropic corner 821a and a second anisotropic corner 821b. Emitted light 815a may reflect from the first anisotropic corner 821a as first reflected light 815b. The light may then reflect from the second anisotropic corner as second reflected light 815c. In this way, retroreflection may be provided with anisotropic protrusions.

Figure 9:
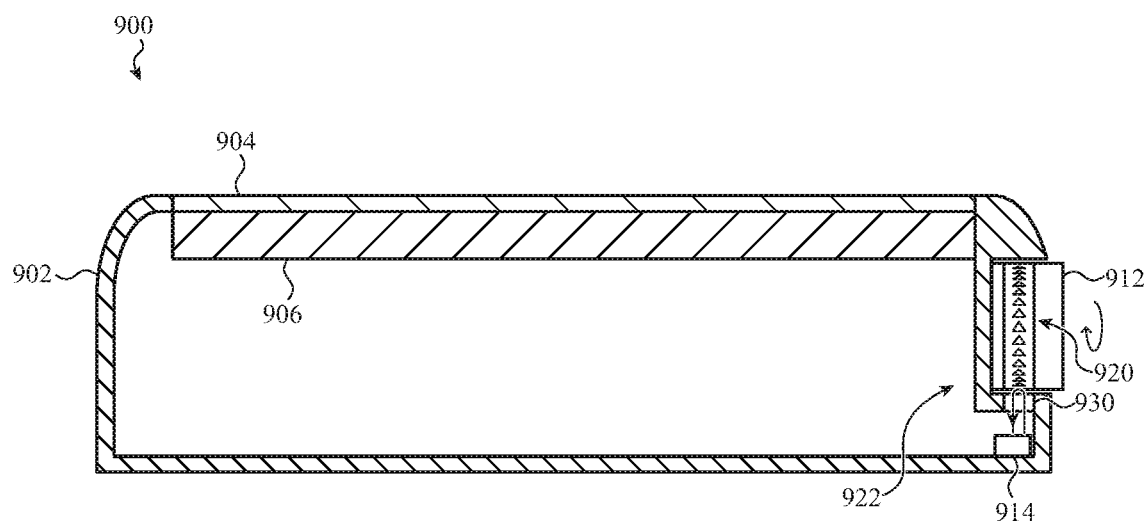
FIG. 9 illustrates an example optical encoder having an array of retroreflective surface features patterned on an internal portion of a crown, as described herein.

FIG. 9 illustrates an example electronic device 900 including an optical encoder 922. The example electronic device 900 may share many of the same features as discussed with reference to FIGS. 3A-3B and duplicative description may be omitted for clarity. The electronic device 900 may include a housing 902, a transparent cover 904 positioned within an opening of the housing, and a display 906 underlying the transparent cover 904.

In the embodiment depicted in FIG. 9, an interior circumference of the crown 912 may be patterned with an array of retroreflective surface features 920. As the array of retroreflective surface features 920 are patterned on an interior surface of the crown 912, an associated shaft may be eliminated. A SMI sensor 914 may be positioned within the housing 902 and may emit, and receive, light to and from the array of retroreflective surface features 920. The light may travel through a window 930 (e.g., a transparent window). In some implementations, the window 930 may be removed and empty space may be provided between the SMI sensor 914 and the array of retroreflective surface features 920. Operations of the optical encoder 922 may be otherwise substantially equivalent to other embodiments as discussed herein.

Figure 10:
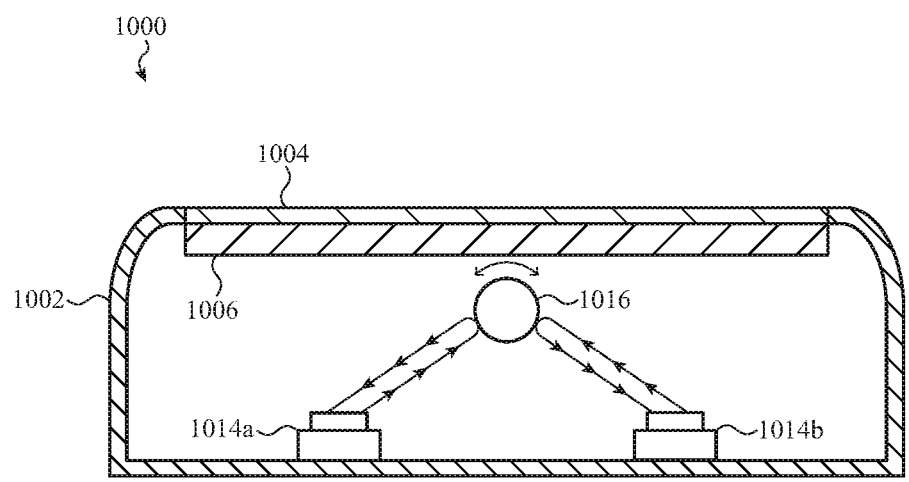
FIG. 10 illustrates an example optical encoder having multiple self-mixing interferometry sensors disposed on opposite sides thereof, as described herein.

FIG. 10 illustrates an example electronic device 1000 including an optical encoder. The optical encoder may include a rotatable shaft 1016, a first SMI sensor 1014a configured to emit and receive light with respect to one side of the rotatable shaft 1016, and a second SMI sensor 1014b configured to emit and receive light with respect to an opposite side of the rotatable shaft 1016. The optical encoder may be positioned within a housing 1002 of the electronic device 1000, which may additionally include a transparent cover 1004 and a display 1006 such as described herein.

The SMI sensors 1014a and/or 1014b may include a lens array that directs emitted light toward a surface of the rotatable shaft 1016 and directs light reflected from the rotatable shaft 1016 to the respective SMI sensor. The SMI sensors 1014a and 1014b may operate in tandem and may be used to eliminate cross-talk of the electronic device 1000. In some embodiments, the SMI sensors 1014a and 1014b may operate in tandem to detect a depression of the rotatable shaft 1016 (e.g., corresponding to a press of an associated crown) in addition to detecting rotation. The rotatable shaft 1016 may include a number of retroreflective features patterned on a surface thereon, such as described herein. Though the SMI sensors 1014a and 1014b are illustrated as being on opposite sides of the rotatable shaft 1016, the SMI sensors 1014a and 1014b may be positioned to emit/receive light along any portion of the rotatable shaft 1016.

Figure 11:
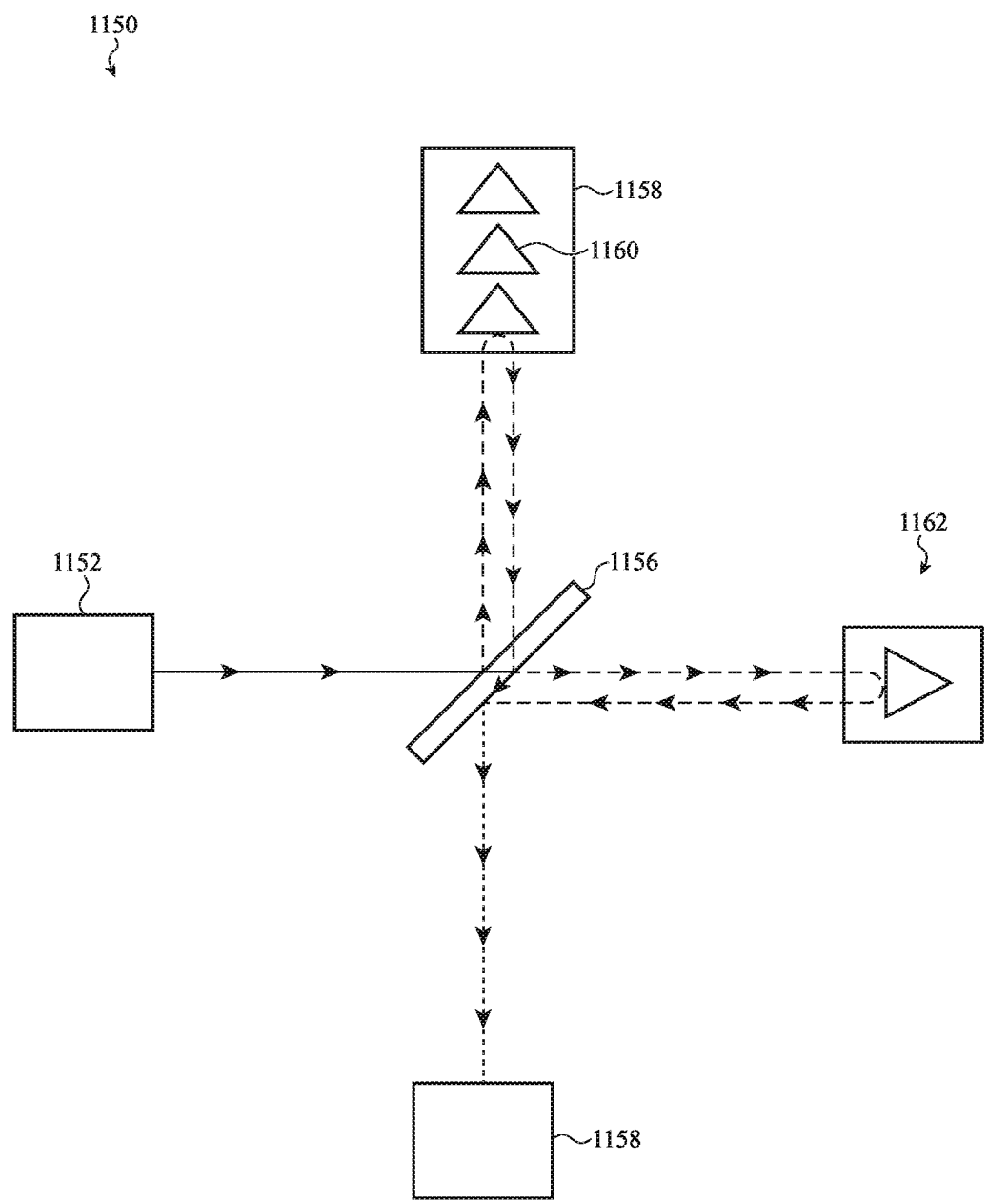
FIG. 11 illustrates an example embodiment of a Michelson interferometer-type configuration as an optical encoder, as described herein.

FIG. 11 illustrates an example optical encoder 1150 utilizing a Michelson-type configuration. The optical encoder 1150 may include a light emitter 1152 (e.g., a laser light emitter), a photodetector 1158, a beam splitter 1156 (e.g., a partially reflective reflector), a reference retroreflector 1162, and a detection object 1158 (e.g., a rotatable shaft) having retroreflective surface features 1160 patterned on a surface thereupon.

The light emitter 1152 may emit light toward the beam splitter 1156. A portion of the emitted light may be reflected toward the retroreflective surface features 1160 and another portion of the emitted light may be refracted toward the reference retroreflector 1162. Light may then reflect from both the retroreflective surface features 1160 and the reference retroreflector 1162 and may be received by the photodetector 1158. The photodetector 1158 may monitor all received light simultaneously throughout the measurement and may be used to detect a movement or distance of the retroreflective surface features 1160 and the detection object 1158 with respect to the reference retroreflector 1162.

Figure 12:
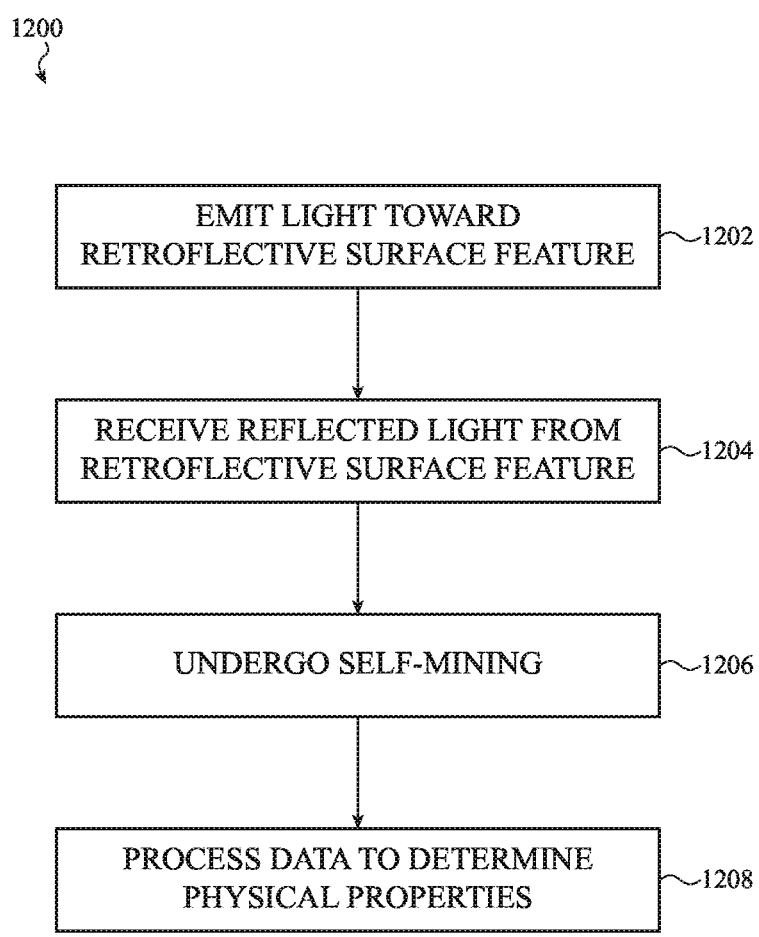
FIG. 12 depicts an example method of an optical encoder, as described herein.

FIG. 12 depicts an example method 1200 in accordance with the provided disclosure. The method 1200 may be performed with respect to any of the apparatuses and/or features described with respect to FIGS. 1A-11 and is not limited to any one particular embodiment.

The method 1200 may begin at operation 1202 by emitting light toward at least one retroreflective surface feature. The light may be emitted by a light emitting component of a self-mixing interferometry (SMI) sensor, such as a VCSEL. A property of the emitted light, such as a wavelength, or a property of the SMI sensor while emitting the light, such as a voltage/current, may be detected while emitting the light at operation 1202. In some implementations, the light may be emitted as a pulse or as a constant beam of light. The emitted light may have any wavelength and may appear in the visible, ultraviolet, or infrared spectrums.

At operation 1204, a light receiver (e.g., a photodetector or photodiode) of the SMI sensor may receive reflected light from the retroreflective surface features. The reflected light may differ, in some respects, from the light emitted at operation 1202. For example, the reflected light may have a different wavelength or intensity due to properties of the retroreflective surface features. For example, if the retroreflective surface features are in motion, the reflected light may vary accordingly. Additionally, a distance between the retroreflective surface features and the SMI sensor may influence a changed property of the reflected light.

At operation 1206, the SMI sensor may perform a self-mixing process. The self-mixing process may mix the emitted light and the reflected light to generate a new beam of light. After undergoing self-mixing, the SMI sensor, or associated components thereof, may process data at operation 1208 to determine position or movement parameters of the retroreflective surface features (e.g., a rotational velocity or a distance). Specific details of the self-mixing process are discussed in reference to FIG. 2.

Figure 13:
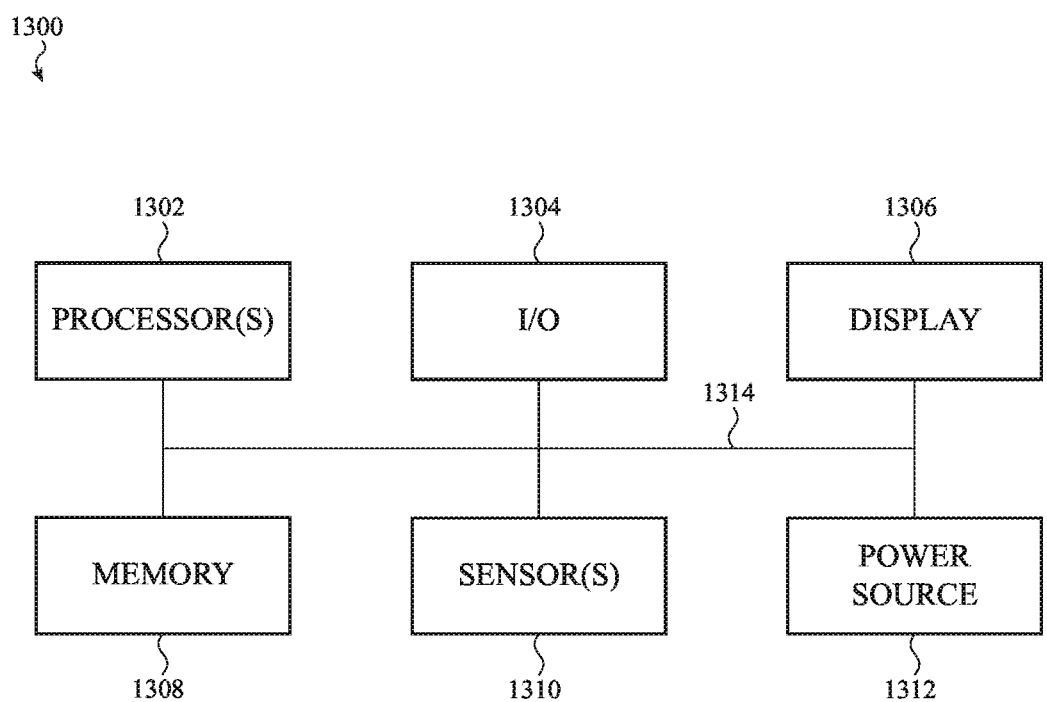
FIG. 13 depicts a block diagram of components of an electronic device including an optical encoder, as described herein.

FIG. 13 depicts an example electrical block diagram of an electronic device 1300, which may in some cases be a wearable electronic device, such as a watch, described with reference to FIGS. 1A-3B. The electronic device 1300 may optionally include an electronic display 1306 (e.g., a light-emitting display), a processor 1302, a power source 1312, a memory 1308 or storage device, a sensor system 1310, and/or an input/output (I/O) mechanism 1304 (e.g., an input/output device, input/output port, or haptic input/output interface). The processor 1302 may control some or all of the operations of the electronic device 1300. The processor 1302 may communicate, either directly or indirectly, with some or all of the other components of the electronic device 1300. For example, a system bus or other communication mechanism 1314 can provide communication between the electronic display 1306, the processor 1302, the power source 1312, the memory 1308, the sensor system 1310, and the I/O mechanism 1304.

The processor 1302 may be implemented as any electronic device capable of processing, receiving, or transmitting data or instructions, whether such data or instructions is in the form of software or firmware or otherwise encoded. For example, the processor 1302 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 1302 may provide part or all of the processing system or processor described herein.

It should be noted that the components of the electronic device 1300 can be controlled by multiple processors. For example, select components of the electronic device 1300 (e.g., the sensor system 1310) may be controlled by a first processor and other components of the electronic device 1300 (e.g., the electronic display 1306) may be controlled by a second processor, where the first and second processors may or may not be in communication with each other.

The power source 1312 can be implemented with any device capable of providing energy to the electronic device 1300. For example, the power source 1312 may include one or more batteries or rechargeable batteries. Additionally or alternatively, the power source 1312 may include a power connector or power cord that connects the electronic device 1300 to another power source, such as a wall outlet.

The memory 1308 may store electronic data that can be used by the electronic device 1300. For example, the memory 1308 may store electrical data or content such as, for example, audio and video files, documents and applications, device settings and user preferences, timing signals, control signals, instructions, and/or data structures or databases. The memory 1308 may include any type of memory. By way of example only, the memory 1308 may include random access memory, read-only memory, Flash memory, removable memory, other types of storage elements, or combinations of such memory types.

The electronic device 1300 may also include one or more sensor systems 1310 positioned almost anywhere on the electronic device 1300. In some cases, the sensor systems 1310 may include one or more SMI sensors, positioned and/or configured as described herein. The sensor system(s) 1310 may be configured to sense one or more types of parameters, such as but not limited to, vibration; light; touch; force; heat; movement; relative motion; biometric data (e.g., biological parameters) of a user; air quality; proximity; position; connectedness; surface quality; and so on. By way of example, the sensor system(s) 1310 may include an SMI sensor, a heat sensor, a position sensor, a light or optical sensor, an accelerometer, a pressure transducer, a gyroscope, a magnetometer, a health monitoring sensor, and an air quality sensor, and so on. Additionally, the one or more sensor systems 1310 may utilize any suitable sensing technology, including, but not limited to, interferometric, magnetic, capacitive, ultrasonic, resistive, optical, acoustic, piezoelectric, or thermal technologies.

The I/O mechanism 1304 may transmit or receive data from a user or another electronic device. The I/O mechanism 1304 may include the electronic display 1306, a touch sensing input surface, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 1304 may transmit electronic signals via a communications interface, such as a wireless, wired, and/or optical communications interface. Examples of wireless and wired communications interfaces include, but are not limited to, cellular and Wi-Fi communications interfaces. The I/O mechanism 1304 may also include a rotatable object, such as the rotatable crown discussed herein.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

What is claimed is:

1. An electronic device comprising:
a housing defining an opening;
a display at least partially covering the opening;
a crown, attached to the housing and operable to be rotated with respect to the housing;
a shaft coupled to the crown and positioned at least partially within the housing, the shaft comprising an array of retroreflective surface features arranged in a single row extending around a circumference of the shaft, wherein each of the retroreflective surface features are separated from adjacent retroreflective surface features;
a self-mixing interferometry (SMI) sensor having a resonant cavity, the SMI sensor mounted to the housing and operable to:
emit light from the resonant cavity toward the crown;
receive, within the resonant cavity, a portion of the emitted light that reflects from at least one retroreflective surface feature in the array of retroreflective surface features; and
generate a SMI signal in response to a self-mixing of light within the resonant cavity; and
processing electronics coupled to the SMI sensor, the processing electronics performing an analysis on the SMI signal and determining, at least partly in response to the analysis, at least one of a position or a movement parameter of the crown.

2. The electronic device of claim 1, wherein:
each retroreflective surface feature of the array of retroreflective surface features is formed as a corner-cube having three perpendicular surfaces; and
the light emitted from the resonant cavity reflects from each of the three perpendicular surfaces before returning to the resonant cavity.

3. The electronic device of claim 1, wherein the array of retroreflective surface features are anisotropic corner surface features.

4. The electronic device of claim 1, wherein the array of retroreflective surface features is arranged on an internal surface of the crown.

5. The electronic device of claim 1, further comprising a sleeve positioned over a portion of the shaft, wherein the array of retroreflective surface features is formed on an outer surface of the sleeve.

6. The electronic device of claim 1, further comprising a material overmolded on the array of retroreflective surface features, the material refracting the light emitted toward the array of retroreflective surface features.

7. An optical encoder comprising:
a shaft having an array of surface features arranged in a single row extending about a circumference of the shaft, each surface feature in the array of surface features defining a first surface, a second surface perpendicular to the first surface, and a third surface perpendicular to the first surface and the second surface, wherein each surface features in the array of surface features are separated from adjacent surface features;
a self-mixing interferometry (SMI) sensor configured to emit light toward the circumference of the shaft, receive a portion of the emitted light reflected from the array of surface features, and generate an SMI signal indicative of a position or movement of the shaft; and
a housing to which the shaft and the SMI sensor are mounted, the mounting of the shaft and the SMI sensor to the housing defining a rotational movement between the shaft and the SMI sensor.

8. The optical encoder of claim 7, wherein each surface feature of the array of surface features is retro reflective.

9. The optical encoder of claim 7, wherein each surface feature of the array of surface features is shaped as a corner-cube.

10. The optical encoder of claim 7, further comprising a sleeve positioned over the shaft, wherein the array of surface features is arranged on an outer surface of the sleeve.

11. The optical encoder of claim 7, further comprising a coating formed about the circumference of the shaft, the coating comprising a gold or a dielectric material, wherein the array of surface features are formed on the coating.

12. The optical encoder of claim 7, wherein the SMI signal is analyzed by processing electronics to identify a rotational velocity of the shaft.

13. A wearable electronic device comprising:
a housing;
a strap coupled to the housing and configured to attach the wearable electronic device to a user;
a display positioned within the housing;
a rotatable crown configured to control an operation of the wearable electronic device, the rotatable crown comprising:
a shaft that extends through the housing; and
an array of retroreflective surface features formed on a surface of the shaft, the array of retroreflective surface features arranged in a single row extending around a circumference of the shaft, wherein each of the retroreflective surface featured are separated from adjacent retroreflective surface features by a same distance; and
a self-mixing interferometry (SMI) sensor configured to emit light toward the array of retroreflective surface features and receive light reflected from the array of retroreflective surface features.

14. The wearable electronic device of claim 13, wherein the SMI sensor is operable to generate a SMI signal in response to receiving light reflected from the array of retroreflective surface features, the SMI signal corresponding to a movement of the rotatable crown.

15. The wearable electronic device of claim 14, wherein the SMI signal is used to control an operation of the wearable electronic device.

16. The wearable electronic device of claim 13, wherein each retroreflective surface feature of the array of retroreflective surface features is formed as a corner-cube having three perpendicular faces.

* * * * *